June 3, 1969  C. J. BROUWER  3,448,368

FREQUENCY INDEPENDENT PHASE CONTROL CIRCUIT

Filed Nov. 2, 1966

INVENTOR.
CORNELIS J. BROUWER
BY
*Frank R. ... *
AGENT

United States Patent Office 3,448,368
Patented June 3, 1969

3,448,368
FREQUENCY INDEPENDENT PHASE
CONTROL CIRCUIT
Cornelis Johannes Brouwer, Emmasingel, Eindhoven,
Netherlands, assignor to U.S. Philips Corporation, New
York, N.Y., a corporation of Delaware
Filed Nov. 2, 1966, Ser. No. 591,591
Claims priority, application Netherlands, Nov. 13, 1965,
6514775
Int. Cl. H02m 1/08, 7/12
U.S. Cl. 321—18        8 Claims

ABSTRACT OF THE DISCLOSURE

A self-oscillating inverter uses a pair of SCR's to supply energy to a variable load that produces frequency variations in the inverter. An alternating control voltage is derived from the inverter and supplied to a gate control circuit that includes a voltage divider and a capacitor having one electrode connected to first and second taps on the voltage divider via a pair of oppositely poled diodes. The other capacitor electrode is coupled to a point of fixed voltage and to the gate electrodes of the SCR's to maintain the firing angle thereof constant despite said frequency variations in the inverter.

---

Figure 1:
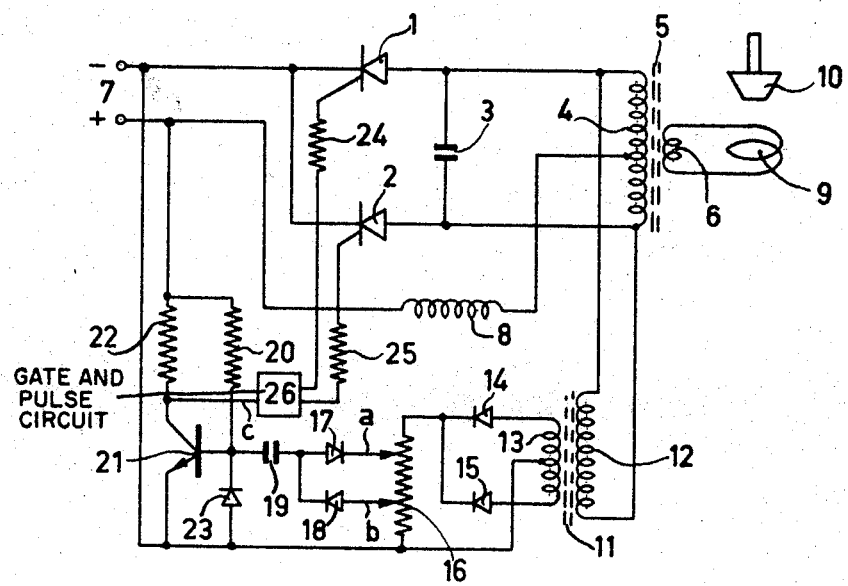

The present invention relates to a device for controlling an electronic switch, for example, a controlled semiconductor rectifier, a thyratron or an ignitron, over a given phase angle of an alternating control voltage. Similar devices have long been known in the thyratron and ignitron technology and were usually used for current and/or voltage controls by phase-delayed firing. In British patent specification 964,255, a device of this type controls one or more controlled semiconductor rectifiers of a self-oscillating converter which transforms a direct voltage into a more or less sinusoidal alternating voltage.

In the known devices and, for example, in the British patent specification, the phase angle over which each controlled rectifier is controlled is determined by means of a phase shifting network, usually a phase shifting bridge. This is a simple solution which gives excellent results when the frequency of the alternating control voltage is constant, for example, when it is derived from the line frequency. In systems in which the frequency of the alternating control voltage varies, for example, with the load of the system, the use of a phase shifting network implies that the phase angle over which the controlled rectifier is controlled, also varies with the frequency of the alternating control voltage which, sometimes, is undesirable.

In a self-controlled converter, i.e. a converter in which the control voltage for the controlled rectifiers is derived from the alternating voltage produced by the converter, a minimum recovery time must be maintained between the instant at which a controlled rectifier is extinguished and the instant at which a forward voltage again appears across said rectifier. In a parallel tuned push-pull converter in which one rectifier is extinguished when that the other becomes conductive, this implies that each rectifier is rendered conductive at a blocking time $t_s$ larger than the characteristic recovery time $t_h$ of the rectifiers in advance of the zero-passage of the voltage across the tuning capacitor. On the other hand, a long blocking time adversely affects the load characteristic of a converter employing several alternately conducting controlled rectifiers.

In a parallel-tuned push-pull converter, the natural frequency of the parallel resonant circuit, consisting of a winding having a centre tap and of the capacitance operative across said winding, is influenced by the load on the converter. When the alternating control voltage is derived from the voltage across said circuit through a phase shifting network, the frequency of the alternating control voltage varies with the load, as does the phase angle with respect to the circuit voltage. Consequently the blocking-time $t_s$ varies to an even greater extent.

It is an object of the invention to provide a device for controlling an electronic switch over a given phase angle of an alternating control voltage in which said phase angle, between the instant at which a switch becomes conductive and the zero-passage of the alternating voltage from which the alternating control voltage is derived, can be chosen within certain limits and is then independent of variations of the frequency and of the magnitude of the alternating control voltage and consequently also of variations of the magnitude of the switched voltage.

The device according to the invention is characterized in that the control voltage is applied to a voltage divider. A tapping of the voltage divider is connected to a first electrode of a capacitor through a first rectifying element. This first electrode is connected through a reversely connected second rectifying element to a point on the voltage divider at which the control voltage is larger than at the tapping. The other electrode of the capacitor is connected to a point of constant potential and is coupled to the control electrode of the electronic switch so that the voltage at the first electrode of the capacitor increases with the voltage at the tapping during a first half of each half cycle of the alternating control voltage of forward polarity with respect to the first rectifying element, and thereafter remains substantially constant until the instantaneous value of the voltage at the said point of the voltage divider becomes smaller than the voltage at the first electrode of the capacitor. Thereafter, during the last part of the half cycle, the voltage at the first electrode of the capacitor decreases with the voltage at said point. The sine of the phase angle corresponding to said last part of the half cycle is substantially equal to the voltage at the tapping divided by the voltage at said point of the voltage divider and is independent of the frequency and amplitude of the alternating control voltage.

Figure 2:
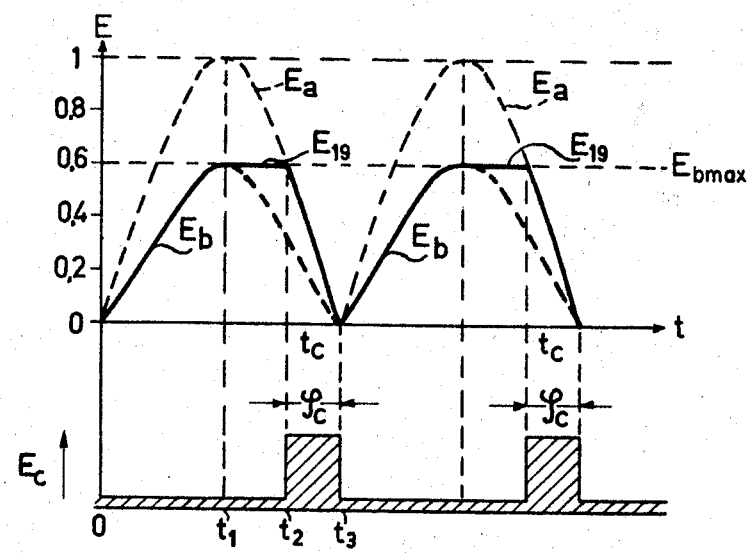

In order that the invention may readily be carried into effect, one embodiment thereof will now be described in greater detail, by way of example, with reference to the accompanying drawing, in which:

FIGURE 1 shows the circuit diagram of a parallel push-pull converter having two electronic switches controlled by means of an embodiment of the device according to the invention; and FIGURE 2 shows a voltage-time diagram for explaining the mode of operation of said device.

FIGURE 1 shows a parallel push-pull converter having two electronic switches 1 and 2 in the form of semiconductor controlled rectifiers. A capacitor 3 is connected between the anodes of the rectifiers 1 and 2 in parallel with the primary 4 of an output transformer 5 having a secondary 6. This converter is energized from a direct voltage source 7 of, for example, 24 volts. The negative terminal of the voltage source is connected to the cathodes of the rectifiers and the positive terminal is connected, through a choke coil 8, to a centre tapping of the primary 4. An inductor 9, adapted to inductively heat a workpiece 10, is connected to the secondary 6. Of course, the effective inductance of the primary 4, and consequently the natural frequency of the parallel resonant circuit 3, 4, varies strongly with the loading of the converter by the workpiece 10.

The converter comprises a device for controlling the electronic switches 1 and 2 over a given phase angle of an alternating control voltage, which angle is adjusted when designing the converter. The alternating control voltage is derived from the voltage across the parallel resonant circuit 3–4 by means of a transformer 11 having a primary 12 and a center tapped secondary 13. The inductance of the primary winding 12 is large with respect to that of the circuit 3–4. The ends of winding 13 are connected to the anodes of rectifiers 14 and 15. The cathodes of diodes 14 and 15 are connected to one end of an ohmic voltage divider 16. This voltage divider is connected at one end to the tapping of the winding 13 and to the negative terminal of the supply source 7. It has two tappings. The lower tapping, is the least positive, is connected to a first electrode of a capacitor 19 through a first rectifier element 18 connected in the forward direction. The capacitor electrode is connected, through a second rectifier element 17 connected in the reverse direction, to the upper tapping of the voltage divider 16 at which the rectified alternating control voltage is larger than at the lower tapping. Through a resistor 20, the other electrode of the capacitor 19 is connected to a point of constant potential constituted by the positive terminal of the supply source 7. It is also connected to the base of a transistor 21 of the npn-type and, through said transistor, a gate and pulse circuit 26, and current limiting resistors 24 and 25, respectively, it is coupled to the control electrode of each of the electronic switches 1 and 2. The transistor 21 is arranged in the common emitter configuration. Its emitter is directly connected to the negative terminal of the direct voltage supply source 7 and its collector is connected to the positive terminal of said source through a load resistor 22. The collector also is connected through the gate and pulse circuit 26 to the ends of the resistors 24 and 25 remote from the control electrodes of the electronic switches 1 and 2. Its base-emitter path is shunted by a diode 23 which limits the voltage applied across said path in the reverse direction to a few tenths of a volt.

The base resistor 20 of the transistor 21 is chosen so that said transistor is conductive when no charge or discharge current flows to or from the capacitor 19. The gate and pulse circuit 26 is, for example, a bistable trigger circuit which alternately supplies the pulses produced at the collector of the transistor 21 to the resistors 24 and 25.

When connecting the converter with its control device to the supply source 7, the capacitor 19 is first charged via the resistor 20. During the charging process, the voltage drop across resistor 20 at first prevents conduction of the transistor 21. Consequently, a forward current is supplied to the control electrode of one of the electronic switches 1 and 2, from the positive terminal of the source 7, through the resistor 22, the gate and pulse circuit 26 and the resistors 24 or 25, respectively. As a result, one of the switches 1 and 2, for example, the switch 1, is rendered conductive.

When the switch 1 becomes conductive, a current flows through this switch, the upper half of the winding 4 and the choke coil 8. As a result, the upper electrode of the capacitor 3 is suddenly brought to a potential substantially equal to that of the negative terminal of the source 7.

The circuit 3–4 is impulsed by the current pulse through the upper half of the winding 4 and oscillates at its resonant frequency. The switch 2 must be rendered conductive after approximately half a cycle of the oscillation. The switches 1 and 2 should thereafter become alternately conductive each half cycle of the same oscillation.

This is brought about as follows by the device 11–26.

The voltage produced across the circuit 3–4 is transmitted by the transformer 11 to the full wave rectifier including the winding 13 and the rectifiers 14 and 15. The full wave rectifier produces an unsmoothed rectified voltage across the voltage divider 16. A part $E_a$ (FIGURE 2) of this voltage appears at the upper tapping of said voltage divider and a smaller part $E_b$ (for example, equal to 0.6 $E_a$) appears at its lower tapping. The transistor is conductive so that the left-hand electrode of the capacitor 19 is connected to the negative terminal of the source 7 through its base-emitter circuit. This electrode has a positive potential of a few tenths of a volt with respect to said negative terminal. Through the first rectifier element 18, the capacitor 19 is charged substantially to the voltage $E_b$, until said voltage again decreases and cuts off the rectifier element 18. The capacitor 19 remains charged at the voltage $E_{bmax}$ until the voltage $E_a$ becomes smaller than $E_{bmax}$ and the second rectifier element 17, which was so far cut off, becomes conductive. From this instant onward, the capacitor voltage $E_{19}$ (between the negative terminal of the source 7 and the common point of the elements 17, 18 and 19) decreases with the voltage $E_a$. The capacitor now discharges through the rectifier element 17, the voltage divider 16, the diode 23 on the one hand, and the resistor 20 on the other hand, so that the transistor 21 is cut off as a result of the voltage drop across the now conductive diode 23. As a result, the very small positive voltage $E_c$ (FIGURE 2) of its collector suddenly becomes much larger so that a forward current now flows from the positive terminal of the source 7 through the resistor 22, the gate and pulse circuit 26 and the separating resistors 24 and 25, respectively, to the control electrode of that of the switches 1 and 2 which is not conducting at this instant. The latter switch is rendered conducting by the forward current and thus causes the extinguishing again of the other electronic switch by reducing the current through said switch below its holding value and holding said current below the holding value during a recovery time.

It will be clear that the parallel resonant frequency of the circuit 3–4, and consequently the operating frequency of the converter described, is influenced by the load 9–10 thereon, particularly when said load has a reactive character. On the other hand, all the known electronic switches have a characteristic recovery time $t_h$ during which they behave as uncontrolled rectifier elements. In other words, after having become non-conductive, they become conductive again even without control if the voltage operative at the anode again becomes positive and causes a current larger than the holding value to flow through the rectifier in question. This recovery time, which elapses until the control electrode regains its controlling action, is related to the deionization of the vapour or gas filling in thyratrons, ignitrons and other controlled vapour or gas filled tubes, and to the dissipation of the minority charge carriers accumulated in the semiconductor layers of semiconductor controlled rectifiers. If the voltage across the tuning capacitor 3 changes sign before the expiration of the recovery time $t_h$ of a switch which has just become non-conductive, the switch can become conductive again at an instant at which the other switch is conductive. This means a short-circuiting of the source 7 through the two switches 1 and 2 and the choke coil 8 and, in the absence of a fuse, usually brings about the destruction of at least one of the switches.

In order to obtain a good loading characteristic, the commutation time $t_c$ (FIGURE 2) must be small, particularly in the case of a reactive load. The cut off time $t_s$, however, should be longer than the characteristic recovery time $t_h$ of the switches 1 and 2.

If the control voltage was derived from the voltage across the capacitor 3 by means of a phase shifting bridge circuit, for example, by replacing the rectifier 14 by an adjustable resistor R and the rectifier 15 by a capacitor C, the commutation phase angle $\varphi_c$ (FIGURE 2) would decrease when the oscillation frequency $f=\omega/2\pi$ increases, in accordance with the equation $$\tan\left(\frac{\varphi_c}{2}\right) = \frac{1}{RC\omega}$$

For phase angles smaller than, for example, 45° it would be approximately inversely proportional to the oscillation frequency. Since the commutation time $t_c$ at invariable phase angle $\varphi_c$ is again inversely proportional to the oscillation frequency, said commutation time would decrease approximately inversely with the square of the oscillation frequency when said frequency increases. The commutation time $t_c$ would thus have to be chosen so that the total cut off time $t_s$ is larger than the recovery time $t_h$ at the highest possible operating frequency of the converter, for example, with a short-circuited secondary 6. In this case the commutation time $t_c$, and consequently the cut off time $t_s$, would become unnecessarily and undesirably long with a smaller load and/or a lower operating frequency.

In the device according to the invention, and as shown in FIGURE 2, the sine of the commutation phase angle $\varphi_c$ (for example, 37°) is substantially equal to the voltage $E_b$ at the lower tapping divided by the voltage $E_a$ at the upper tapping of the voltage divider 16, and is independent of the frequency and of the amplitude of the oscillation voltage across the tuning capacitor 3. As a result, the commutation time $t_c$ is inversely proportional to said frequency and increases far less strongly with decreasing frequency.

The device according to the invention has been explained in connection with its use for the control of the electronic switches of a parallel tuned push-pull converter. It will be clear, however, that said device can advantageously be used in other systems, for example, for controlling the electronic switch(es) of a voltage stabilizer or of a rectifier to obtain an easily adjustable delayed firing angle which is independent of the frequency of the alternating control voltage.

What is claimed is:

1. A device for controlling an electronic switch over a given phase angle of an alternating control voltage comprising, a voltage divider having first and second taps, means for coupling the control voltage to said voltage divider so that the voltage at the first tap is higher than the voltage at the second tap, a capacitor, a first rectifier element, means connecting a first electrode of the capacitor through said first rectifier element to said second tap on the divider and through a second oppositely poled rectifier element to said first tap on the voltage divider, means connecting the other electrode of the capacitor to a point of constant potential and to a control electrode of the electronic switch, said control voltage being coupled to said voltage divider with a polarity such that the voltage at the first electrode of the capacitor increases with the voltage at the second tap during a first half of each half cycle of forward polarity of the control voltage with respect to the first rectifier element and thereafter remains substantially constant until the instantaneous value of the voltage at said first tap on the voltage divider becomes smaller than the voltage at the first electrode of the capacitor, whereby during a last part of the half cycle the voltage at the first electrode of the capacitor decreases with the voltage at the first tap, the sine of the phase angle corresponding to said last part of the half cycle being substantially equal to the voltage at the second tap divided by the voltage at said first tap on the voltage divider and being substantially independent of the frequency and amplitude of the control voltage.

2. A device as claimed in claim 1 further comprising a transistor having a base electrode connected to the other electrode of the capacitor, means coupling the emitter collector circuit of the transistor to the control circuit of the electronic switch, and means connecting the transistor in circuit so that said transistor is cut off by the discharge current of the capacitor that occurs during the last part of each half cycle of the control voltage of forward polarity with respect to the first rectifier element.

3. A device as claimed in claim 1 for controlling two alternately conducting electronic switches further comprising a full wave rectifier having input means coupled to the alternating control voltage and output means coupled to the voltage divider, said full wave rectifier being poled so that it supplies to said voltage divider a rectified control voltage of forward polarity with respect to the first rectifier element.

4. A device for controlling the flow of energy between a source of voltage and a load by means of a controlled rectifier element having a control electrode, the improvement comprising a phase control circuit for deriving an adjustable control voltage for regulating the firing angle of the rectifier comprising, a source of alternating control voltage, means for converting said alternating control voltage to a periodic voltage of a given polarity, a voltage divider having a first high voltage tap and a second low voltage tap, means for coupling said periodic voltage to the voltage divider, a capacitor, first and second rectifier elements, means connecting said first rectifier element between said second tap and one electrode of the capacitor to provide a charge path therefor, means connecting said second rectifier element between said first tap and said one capacitor electrode with reverse polarity to provide a discharge path therefor, and means for coupling the other capacitor electrode to a point of constant voltage and to said controlled rectifier control electrode to supply thereto a control voltage that is independent of frequency and amplitude variations of said alternating control voltage.

5. A device as claimed in claim 4 further comprising pulse producing means coupled between said capacitor other electrode and the control electrode of said controlled rectifier and controlled by said capacitor, the pulses produced by said pulse producing means being determined by the setting of said first and second taps on the voltage divider.

6. A DC–AC converter comprising a pair of controlled rectifiers, a transformer having a primary and a secondary winding, a load coupled to the secondary winding, a capacitor connected across said primary winding to form a resonant circuit, a source of DC voltage, means connecting said pair of rectifiers in push-pull between said voltage source and said resonant circuit, means coupled to said resonant circuit for deriving an alternating control voltage, a voltage divider having first and second taps, a second capacitor, first and second rectifier elements, means for coupling said control voltage to the input of said voltage divider so that said first tap is at a higher voltage than said second tap, means connecting said first rectifier element between one electrode of the second capacitor and said second tap with a given polarity such that the second capacitor is charged via said first rectifier element during the initial portion of a half cycle of the control voltage, means connecting said second rectifier element between said one electrode of the second capacitor and said first tap with opposite polarity so that the second capacitor is discharged via said second rectifier element during a final portion of said half cycle of the control voltage, and means for coupling the other electrode of said second capacitor to the control electrodes of said pair of controlled rectifiers so as to alternately trigger same into conduction for a time period determined by the ratio of the voltage at said second tap to the voltage at said first tap, said voltage ratio being substantially independent of the frequency and amplitude of the control voltage.

7. A converter as claimed in claim 6 further comprising a full-wave rectifier circuit coupled between said control voltage deriving means and the input of the voltage divider and poled so that said first and second rectifier elements conduct exclusively during the initial and final portions, respectively, of each half cycle of the control voltage.

8. A converter as claimed in claim 7 further comprising pulse generating means responsive to the charge and discharge of said second capacitor and coupled to the control electrodes of said pair of controlled rectifiers for supplying thereto a pulse-type control voltage.

(References on following page)

References Cited
UNITED STATES PATENTS 3,010,062  11/1961  Van Emden _____ 321—18
3,325,716  6/1967  Gomi _____ 321—18 X JOHN F. COUCH, *Primary Examiner.*
A. D. PELLINEN, *Assistant Examiner.*

U.S. Cl. X.R.

321—45; 323—22, 39